June 14, 1927.
C. L. JOHNSON
1,632,655
AUTOMOBILE LOCK
Filed April 11, 1921   2 Sheets-Sheet 2
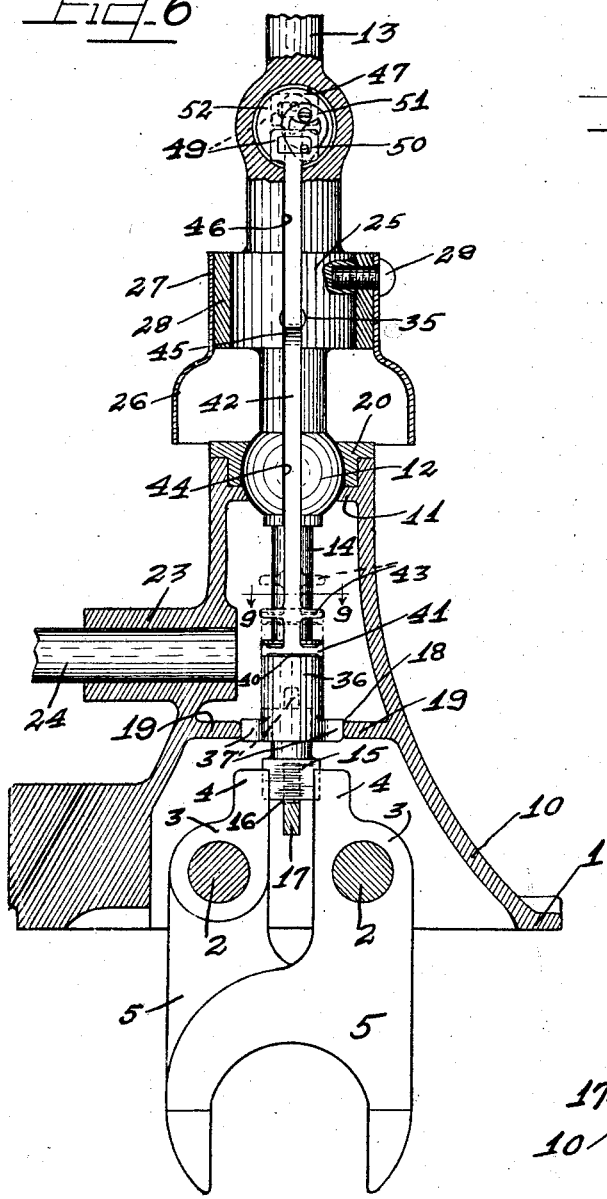
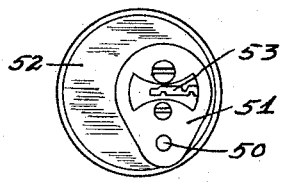
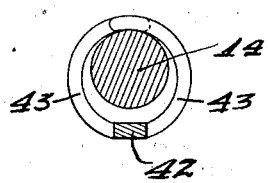
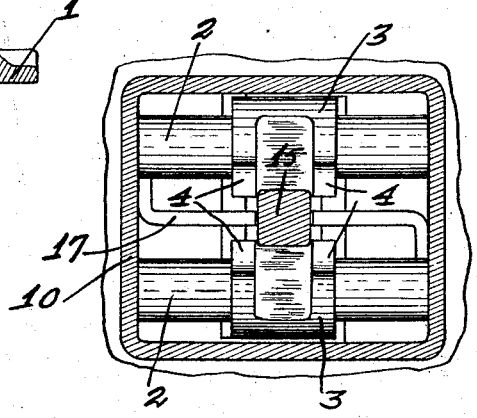
Witnesses
Rudolph T. Berg
Charles W. Hill Jr.
Inventor
Colvin L. Johnson
By Charles W. Hill
Atty.

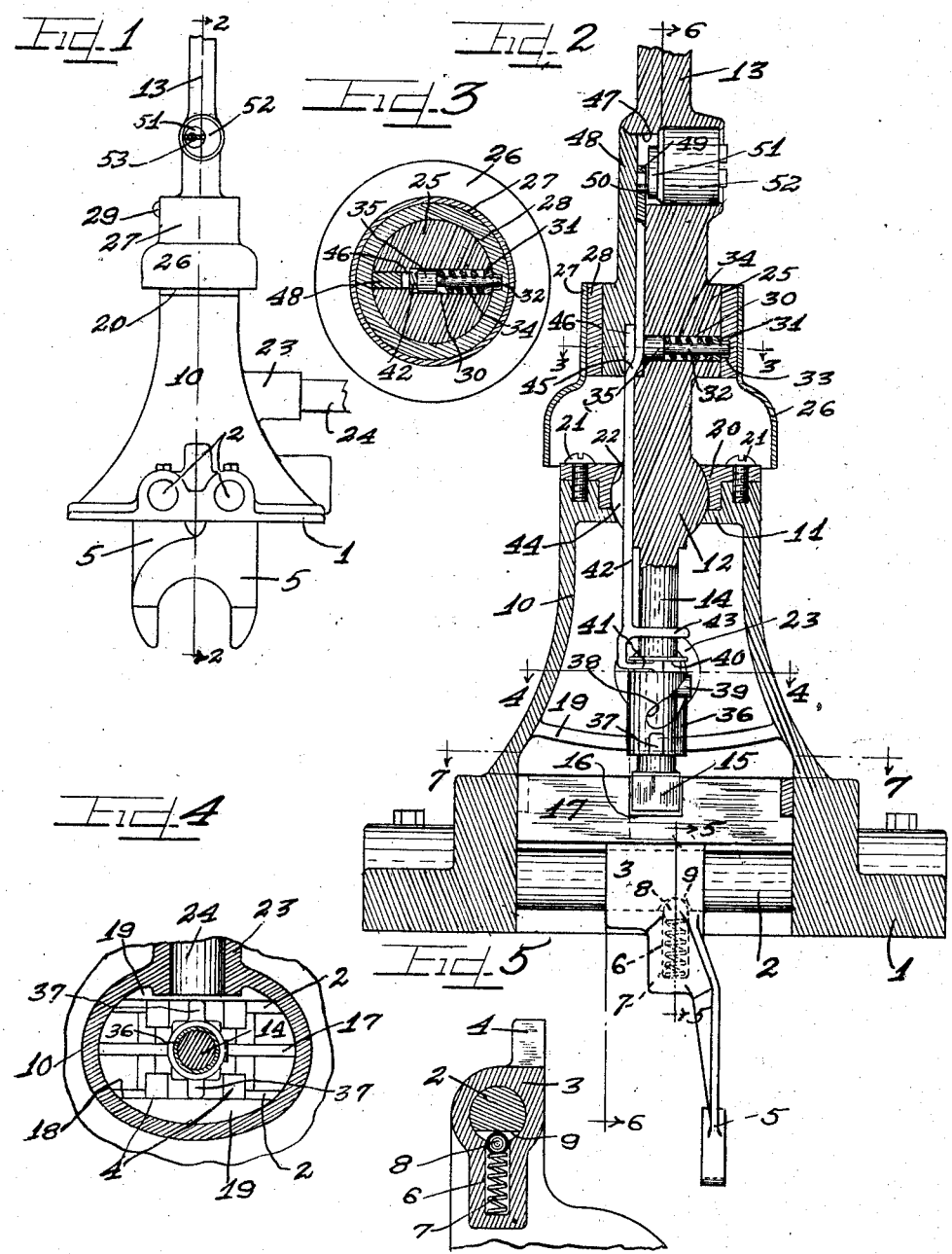

Patented June 14, 1927.

1,632,655

UNITED STATES PATENT OFFICE.

COLVIN L. JOHNSON, OF CHICAGO, ILLINOIS, ASSIGNOR TO JOHNSON AUTOMOBILE LOCK CO., A CORPORATION OF ILLINOIS.

AUTOMOBILE LOCK.

Application filed April 11, 1921. Serial No. 460,287.

This invention pertains to an improved gear shift lever lock, wherein a key operated locking member slidably and rotatably mounted on the lower portion of a gear shift lever is adapted to be simultaneously lowered and partially rotated to permit locking lugs thereon to engage between a pair of spaced partitions or webs, formed in the pedestal of a transmission housing, for the purpose of holding the gear shift lever locked against movement.

It is an object of this invention to provide a gear shift lever lock having a locking member adapted to be lowered into locking position.

Another object of the invention is the construction of a gear shift lever lock wherein a locking member on said lever having locking lugs thereon normally positioned parallel to a slot in a housing plate is adapted to be lowered and partially rotated to position the locking lugs transversely in said slot to hold the lever locked against adjustment.

It is also an object of the invention to provide a gear shift lever with an adjustable locking member which when actuated is adapted to be rotated in order that locking lugs thereon may be positioned to clear an obstruction in a gear shift lever housing to permit operation of the gear shift lever when the locking member is in release position.

A further object of the invention is to provide a gear shift lever with a slidable locking member having a cam slot therein through which a pin on the lever projects so that when the locking member is actuated by a pin lock mechanism, it is partially rotated on the lever to properly position locking lugs on said member with respect to the lever housing.

It is furthermore an object of this invention to provide a gear shift lever with a cap for covering the upper end of a transmission housing pedestal, said lever having mounted therein an inaccessible spring controlled means actuable by a lever locking latch bar mechanism to hold the cap locked to said lever to prevent access to the mounting screws which hold the retaining member for the lever in place upon said pedestal.

Still another object of the invention is to provide a gear shift lever mechanism adapted to be operated to actuate transmission fork members slidably mounted on stationary transmission rods and having spring impelled ball detents therein which act to hold the fork members against accidental movemen on said transmission rods.

It is an important object of this invention to provide a gear shift lever mechanism of effective and simple construction wherein the housing enclosing the lower portion of the gear shift lever is provided with web members adapted to be engaged by a locking member on said lever to hold the lever locked against operation.

Other and further important objects of this invention will be apparent from the disclosures in the specification and the accompanying drawings.

The invention (in a preferred form) is shown on the drawings and hereinafter more fully described.

On the drawings:

Figure 1 is an elevation of a transmission control mechanism the gear shift lever of which is equipped with a locking device embodying the principles of this invention.

Figure 2 is an enlarged vertical section taken on line 2—2 of Figure 1, showing parts in elevation.

Figure 3 is a detail section taken on line 3—3 of Figure 2 with the locking bolt in elevation.

Figure 4 is a fragmentary detail section taken on line 4—4 of Figure 2.

Figure 5 is an enlarged fragmentary detail section taken on line 5—5 of Figure 2.

Figure 6 is a detail sectional view taken on line 6—6 of Figure 2.

Figure 7 is a sectional plan view taken on line 7—7 of Figure 2.

Figure 8 is an enlarged inner end elevation of the pin lock mechanism.

Figure 9 is an enlarged detail section taken on line 9—9 of Figure 6.

As shown on the drawings:

The reference numeral 1 indicates a transmission housing or casing cover having an opening therein. Supported in the cover 1 are two stationary transmission rods 2 spaced a short distance apart and parallel to one another. Slidably engaged on each rod 2 is a block 3 provided with integral upright lugs 4 and an integral downwardly projecting gear shift fork 5. Each block 3 is provided with a recess 6 for receiving a coiled spring 7. The spring 7 serves to hold a detent or ball 8 engaged in a notch 9 of the respective rod 2, as illustrated in Figure 5, to hold a block in neutral position and further prevent accidental shifting of a block on its rod.

Integrally formed on top of the transmission cover 1 over the opening therein is an upright housing or pedestal 10 the upper end of which is closed by a wall 11 having a circular opening therein to receive a ball portion 12 of a gear shift lever 13 seated therein. The tail piece 14 of the lever is enclosed by the pedestal 10 and has a head 15 integrally formed on the lower end thereof. When the lever is in neutral or normal position, the head 15 is positioned to engage in a notch 16 provided in a vertical partition or plate 17 the ends of which are bent at an angle and rigidly secured to the inner walls of the pedestal 10. The partition 17 is disposed above the transmission rods 2 and between the lugs 4 of the respective shifting forks. The tail piece 14 of the gear shift lever projects through an opening or slot 18 provided in the pedestal between two webs or locking plates 19 which are integrally formed within the pedestal to form a partition in the pedestal above the rods 2.

To hold the ball portion 12 of the lever adjustably seated in place a top plate or cover 20 is secured upon the top of the pedestal 10 by screws 21. The top plate 20 is provided with a socket 22 which fits over the upper part of the ball 12.

Integrally formed on one side of the pedestal 10 is a bearing sleeve 23 the inner end of which projects into the pedestal above one of the locking webs 19. Engaged in the sleeve 23 is a shaft or axle 24 to afford a mounting for an emergency lever. The pedestal 10 and the sleeve 23 and axle 24 form part of the standard equipment of a Cleveland automobile.

The gear shift lever 13 projects upwardly above the pedestal and has integrally formed thereon a short distance above the ball portion 12 an enlarged circular collar or flange 25. A bell-shaped cap or hood 26 has the reduced upper end 27 thereof lined with a cylindrical sleeve 28 which is brazed or otherwise rigidly secured within said end portion 27. The sleeve 28 engages around the lever flange 25 and is held in place by a screw 29 accessible from the exterior of the cap. The enlarged portion 25 of the lever is provided with a diametrical passage or opening 30 the outer end of which is closed by an apertured plug 31. Slidably engaged in the passage 30 and projecting out through the plug 31 is a locking bolt or latch 32 the outer end of which is adapted to seat in a notch or recess 33 provided in the inner surface of the cap sleeve 28. A coiled spring 34 is disposed within the passage 30 around the bolt 32. One end of the spring 34 seats against the inner end of the plug 31, while the other end of said spring bears against a head 35 integrally formed on the inner end of said bolt 32, as illustrated in Figure 2. The spring 34 normally acts to hold the locking bolt 32 out of locking engagement with the notch 33 of the cap sleeve 28. When the reduced cap portion 27 is secured to the lever the enlarged cap 26 projects downwardly to enclose the upper end of the pedestal 10 and prevent access to the screws 21 thereby making it impossible to remove the lever from its mounting.

Slidably mounted on the lever tail piece 14 between the head 15 and the ball 12 is a locking collar or sleeve 36 having integrally formed on opposite sides of the lower end thereof locking projections or lugs 37. The locking sleeve 36 is provided with a cam slot 38 through which a pin 39 projects. The pin 39 is rigidly secured to the lever tail piece and co-acts with the cam slot 38 to give the locking sleeve a rotary motion when it is moved longitudinally on the tail piece 14. The upper end of the locking sleeve 36 is provided with a peripheral groove 40 to receive a fork 41 which is integrally formed at right angles on the lower end of a latch bar 42. Integrally formed on the latch bar 42 directly above the fork 41 are two arms 43 the ends of which are bent to engage around the tail piece 14 to hold the fork 41 engaged in the groove 40 of the locking sleeve 36.

The latch bar 42 extends upwardly through a groove or slot 44 in the ball 12 and is bent or deflected inwardly at 45 to permit the upper end of said latch bar to slidably engage within a slot or passage 46 formed longitudinally in one side of the lever 13 and extending from the bottom of the flange 25 upwardly to communicate with a chamber 47 formed in the lever a short distance above the flange 25. As illustrated in Figure 2, the passage 46 is closed by a suitably shaped retaining strip or closure bar 48 which is disposed in the outer part of said passage 46 and is rigidly secured in the lever 13 by any suitable means to enclose the upper portion of the latch bar 42. The portion of the latch bar below the offset 45 is positioned on the exterior of the lever but is enclosed by the cap 26 and the pedestal 10.

Integrally formed on the upper end of the latch bar 42 is a slotted head 49 adapted to receive a lock pin 50. The pin 50 is formed on a barrel 51 of a pin lock 52. The pin lock 52 is mounted in the lever chamber 47 and is adapted to receive a key in the key slot 53 for rotating the lock barrel whereby the latch bar 42 may be raised or lowered to operate the locking sleeve 36.

The operation is as follows:

In neutral position the gear shift lever 13 has the lower enclosed end thereof disposed vertically in the housing or pedestal 10 so that the shift head 15 projects into the notch 16 of the stationary plate 17 and between the shifting forks 3 on the transmission rods 2, as illustrated in Figure 7. Normally the locking sleeve 36 is in its elevated release position as shown in dotted lines in Figure 6. To shift the gears of a transmission a composite movement of the gear shift lever 13 is necessary, that is, the lever must be thrown to one side and either forwardly or rearwardly for the purpose. The shift head 15 is thus moved out of the notch 16 to engage between the two lugs 4 of one of the shifting forks 5. The forward or rearward movement of the lever will thus cause the engaged fork 5 to be shifted upon its rod 2 to effect a shifting of the gears in the transmission. The spring impelled detent or ball 8 in the fork 5 is forced into the recess 6 against the action of the spring 7 when the fork is shifted by the gear shift lever. A fork moved into a selected position is held in place by the ball 8 which is forced to engage in a notch in the respective rod 2 corresponding to the desired speed selected. The fork 5 which is not shifted is prevented from sliding by its spring impelled ball 8. When a shifted fork is brought back into neutral position the compressed spring 7 acts automatically to force the ball 8 to engage in the notch 9 of the respective stationary transmission rod 2 to hold the fork in neutral position against accidental shifting. By referring to Figure 7 it will be noted that the gear shift lever head 15 when in neutral position is partially engaged between the lugs 4 of the respective shifting forks 5 thereby also preventing accidental shifting of the forks on the rods 2.

In the unlocked position of the lever 13 the pin 50 of the pin lock 52 is in its uppermost position at one end of the slot in the latch bar head 49. The latch bar 42 is thus held in elevated position with the locking sleeve 36 raised so that the locking lugs 37 thereof are positioned at right angles to the locking position thereof or above and parallel to the webs 19.

To lock the gear shift lever 13 from movement, it is first moved into neutral position and by means of a key inserted into the pin lock key slot 53, the barrel 51 is rotated. The pin 50 slides in the slot of the latch bar head 49 and thus forces the latch bar 42 downwardly. Downward movement of the latch bar causes the latch bar fork 41 to move the locking sleeve 36 downwardly on the tail piece 14. The pin 39 near the lower end of the lever tail piece acts in the cam slot 38 and causes the locking sleeve 36 to rotate a quarter of a turn as it is lowered into locking position. It will thus be noted that the locking lugs 37 on the sleeve 36 are moved into a locking position to engage between the stationary webs 19 at right angles to said webs thereby locking the gear shift lever 13 in neutral position against movement.

Simultaneous with the downward movement of the latch bar, the offset portion 45 thereof strikes the rounded head 35 of the bolt 32 and forces the bolt outwardly into the notch 33 in the cap sleeve 28 thereby compressing the spring 34 and holding the cap 26 locked from the inside to make removal of the cap impossible when the gear shift lever is locked. The cap is locked in place from the exterior by the screw 29 which if removed would not permit removal of the cap 26 when the gear shift lever 13 is locked due to the emergency locking mechanism in the lever which is controlled by the latch bar 42. When the latch bar is in its upper or release position the spring 34 acts to withdraw the locking bolt 32 from engagement with the cap sleeve 28.

To unlock the gear shift lever 13 it is only necessary to insert the key in the lock 52 and turn the barrel 49 in an opposite direction. The latch bar 42 is drawn upwardly thereby causing the locking sleeve 36 to be pulled upwardly and rotated at the same time to release the locking lugs 37 from engagement with the pedestal webs 19 to permit operation of the lever.

Attention is directed to the fact that the locking sleeve is partially rotated as it is moved into and out of locking position. This is done to permit the locking lugs 37 on the sleeve 36 when elevated to clear the inner projecting end of the axle 24 and the bearing sleeve 23 which project into the pedestal and form a standard part of a particular make of automobiles with which the improved gear shift locking mechanism of this invention is intended to be used.

I am aware that numerous details of construction may be varied through a wide range without departing from the principles of this invention, and I therefore do not purpose limiting the patent granted otherwise than necessitated by the prior art.

I claim as my invention:

1. A gear shift lever lock comprising a gear shift lever, a pivotal mount on said lever, locking means therein, a key in said locking means, a housing, locking webs therein, and means slidably and rotatably mounted on said lever and connected with said locking means to be moved downwardly by said key into locking engagement between said locking webs to hold the lever locked against movement about said pivotal mount.

2. An automobile locking mechanism comprising a gear shift lever, a locking member slidable on the lever and having a cam slot therein, a pin secured to said lever projecting through said cam slot, locking means in said lever connected with said locking member, and spaced stationary plates between which the lever projects, said locking means adapted to be actuated to lower said locking member, said pin co-acting with said cam slot to rotate the locking member to position the same to engage said stationary plates to hold the lever locked against movement.

3. In a gear shift lever lock the combination with a gear shift lever, of key operated means therein, a locking member mounted on said lever and connected with said key operated means, said locking member having a cam slot therein, a pin on said lever projecting through said cam slot, a housing for supporting said lever, spaced webs integrally formed in said housing between which said lever projects, and locking lugs integrally formed on said locking member, said key operated means adapted to be operated to lower said locking member whereby the pin on said lever acts to partially rotate the locking member as it is lowered to move the locking lugs into engagement with said webs to hold the lever locked.

4. A lock comprising a gear shift lever having a chamber and a passage therein communicating with one another, a housing supporting the lever and enclosing the lower end thereof, stationary means in said housing between which the lower end of the lever projects, key operated means in said chamber, a latch bar in said lever passage connected to be operated by said key operated means, a slotted locking member slidably engaged on the lower end of said lever, means on said latch bar connected to said locking member to actuate the same, a pin on said lever engaging said slotted locking member to rotate the same when the member is slidably adjusted on said lever, and locking lugs formed on opposite sides of said slotted locking member adapted to engage said stationary means to hold the lever locked.

5. In a locking device, a gear shift lever, key operated means therein, a housing for supporting the lever, stationary means in said housing between which the lower end of the lever projects, a locking sleeve slidably and rotatably engaged on said lever and having a cam slot therein, a pin secured on the lever projecting through said cam slot, a latch bar in said lever connected to be operated by said key operated means, said locking sleeve having a groove therein, a fork formed on said latch bar and engaged in said groove, and locking lugs formed on said locking sleeve to engage said stationary means to hold the lever locked when said key operated means is actuated to lower the latch bar and said sleeve into locking position.

6. In a lock of the class described, the combination with a gear shift lever the supporting housing thereof, and a pivotal mount on said lever of a locking member slidably and rotatably mounted thereon, and means connected therewith for simultaneously sliding and rotating said member to move the same into engagement with said housing to hold the lever locked against movement about said mount.

7. In a locking device of the class described, the combination with a gear shift lever and the housing thereof, of a locking member engaged on said lever having a groove and a slot therein, means on said lever engaged in said groove to permit said member to be slidably moved on said lever into locking engagement with said housing, and means on said lever engaging in said slot to cause rotation of said member when it is moved on said lever.

8. In a locking device of the class described, the combination with a gear shift lever and the housing thereof, of a member forming part of the housing and projecting therein, a locking sleeve engaged on said lever within the housing and having a groove and a cam slot therein, spaced webs integrally formed in said housing on opposite sides of said lever, key operated locking means in said lever, a fork forming a part thereof and engaged in the sleeve groove to permit slidable adjustment of the sleeve on said lever, locking lugs integrally formed on opposite sides of said sleeve normally disposed longitudinally of said webs, and a pin on said lever projecting through the sleeve cam slot to cause rotation of said sleeve when slidably adjusted to position the locking lugs at right angles and between said webs to hold the lever locked against movement, said cam slot and pin also serving to rotate the sleeve when released to cause the locking lugs to clear the housing member to permit operation of the lever when the lever is unlocked.

9. The combination with a gear shift casing, a gear shift lever, a closure for said casing, a locking device associated with said lever, said locking device being concealed in said casing, and means comprising a latch bar slidable in said lever to simultaneously lock said lever and closure.

10. The combination with a gear shift lever, of a slidable mechanism associated therewith, a locking member operatively connected to said slidable mechanism, said locking member being rotatively movable responsive to said slidable member, and key operated means for controlling said slidable member.

11. The combination with a gear shift lever and the supporting housing thereof, of retaining means removably secured on said housing for holding the lever in place, a cap on said lever for enclosing the retaining means, exterior means for securing said cap to said lever, a lever locking mechanism on said lever, a cap locking device comprising a spring pressed bolt in said lever, inaccessible from the exterior of said cap, and means comprising a latch bar on said lever adapted to be actuated to simultaneously move said lever locking mechanism into locking engagement with said housing and said cap locking device into locking engagement with said cap.

12. The combination with a gear shift lever, of lever locking means thereon, key operated means including a latch bar for moving said locking means into locking position, a hood member on said lever, and internal locking means for said hood member simultaneously operable with said lever locking means by said key operated means.

13. The combination with a gear shift lever, of a locking means thereon, a cap member on said lever, a spring impelled bolt in said lever, key operated means in said lever, and a latch bar in said lever connected with said key operated means and with said lever locking means, said latch bar adapted to be operated by said key operated means to move said lever locking means into locking position and at the same time move said spring impelled bolt into locking engagement with said cap member.

14. The combination with a gear shift casing, of a gear shift lever, a cap member on said lever for closing said casing, lever locking means within said casing, cap locking means associated with said lever, and means selectively operable to simultaneously render said lever and cap locking means operable.

15. The combination with a casing a gear shift lever, of a hood member for said casing, means for securing the hood member to said lever from the exterior of the hood member, a spring impelled locking bolt in said lever, and key operated means comprising a latch bar in said lever adapted to be actuated to move said spring impelled locking bolt into locking engagement with the interior of said hood member.

16. A gear shift lever lock comprising a pivoted gear shift lever, locking mechanisms thereon above and below the pivot point thereof, and means comprising an offset latch bar in said lever for simultaneously moving said locking mechanisms into locking position to hold the lever locked against operation.

17. A gear shift lever lock comprising a ball gear shift lever, a plurality of locking mechanisms thereon above and below the ball on said lever, a lock device in said lever, and latch bar means operable thereby adapted to move all of said locking mechanisms into locking position.

18. The combination with a gear shift casing, a gear shift lever, a closure for said casing, lever locking means in said casing, a latch bar reciprocable in said lever, a spring pressed bolt in said lever adapted to be projected therefrom to internally lock said closure when said lever locking means is actuated by said latch bar.

19. The combination with a gear shift lever, of a slidable member within said lever, said member being deflected laterally to define a portion thereof slidable adjacent said lever, a cap member on said lever, and a latch bolt engageable with said slidable member, said latch bolt responding to said deflected slidable member to internally lock said cap to said lever.

In testimony whereof I have hereunto subscribed my name.

COLVIN L. JOHNSON.